(12) United States Patent
Tian et al.

(10) Patent No.: US 11,741,881 B2
(45) Date of Patent: Aug. 29, 2023

(54) DISPLAY IMAGE COMPENSATION METHOD, DEVICE, ELECTRONIC EQUIPMENT, AND STORAGE MEDIUM

(71) Applicant: Shenzhen China Star Optoelectronics Semiconductor Display Technology Co., Ltd., Guangdong (CN)

(72) Inventors: Fan Tian, Guangdong (CN); Taijiun Hwang, Guangdong (CN)

(73) Assignee: Shenzhen China Star Optoelectronics Semiconductor Display Technology Co., Ltd., Shenzhen (CN)

(*) Notice: Subject to any disclaimer, the term of this patent is extended or adjusted under 35 U.S.C. 154(b) by 486 days.

(21) Appl. No.: 16/975,727

(22) PCT Filed: Jun. 3, 2020

(86) PCT No.: PCT/CN2020/094218
§ 371 (c)(1),
(2) Date: Aug. 26, 2020

(87) PCT Pub. No.: WO2021/227155
PCT Pub. Date: Nov. 18, 2021

(65) Prior Publication Data
US 2023/0097372 A1  Mar. 30, 2023

(30) Foreign Application Priority Data
May 14, 2020  (CN) .......................... 202010406177.7

(51) Int. Cl.
- *G09G 3/22* (2006.01)
- *G06V 10/74* (2022.01)
- *H04N 7/01* (2006.01)

(52) U.S. Cl.
CPC ............. *G09G 3/22* (2013.01); *G06V 10/761* (2022.01); *H04N 7/0127* (2013.01); *G09G 2320/0626* (2013.01)

(58) Field of Classification Search
CPC ............. G09G 3/22; G09G 2320/0626; G06V 10/761; H04N 7/0127
See application file for complete search history.

(56) References Cited

U.S. PATENT DOCUMENTS

| | | | |
|---|---|---|---|
| 2010/0164937 A1* | 7/2010 | Kim | G09G 3/3225 345/212 |
| 2015/0154908 A1* | 6/2015 | Nam | G09G 3/3233 345/76 |
| 2020/0013334 A1* | 1/2020 | Kang | G09G 3/3291 |
| 2020/0211475 A1* | 7/2020 | Park | G09G 3/3275 |
| 2020/0265788 A1* | 8/2020 | Kim | G09G 3/2003 |

* cited by examiner

*Primary Examiner* — Towfiq Elahi

(57) ABSTRACT

A compensation method disclosed in this application comprises following steps of: obtaining a display image and determining whether the display image is a still image; if the display image is a still image, preprocessing the still image to reduce power consumption of the display image, thereby obtaining a target display image after preprocessing; detecting the target display image to obtain a threshold voltage data and a mobility parameter; and compensating the display image according to the threshold voltage data and the mobility parameter.

14 Claims, 4 Drawing Sheets

DISPLAY IMAGE COMPENSATION METHOD, DEVICE, ELECTRONIC EQUIPMENT, AND STORAGE MEDIUM

RELATED APPLICATIONS

This application is a National Phase of PCT Patent Application No. PCT/CN2020/094218 having International filing date of Jun. 3, 2020, which claims the benefit of priority of Chinese Patent Application No. 202010406177.7 filed on May 14, 2020. The contents of the above applications are all incorporated by reference as if fully set forth herein in their entirety.

FIELD AND BACKGROUND OF THE INVENTION

The present application relates to the field of display technology, in particular to a display image compensation method, device, electronic equipment and storage medium.

In an organic light emitting display (OLED) panel, due to manufacturing process limitations, electrical characteristics of each of driving thin film transistors is different, and each of the driving thin film transistors is unstable in the working process, and it is easily affected by temperature, light, and other factors. The difference in the electrical characteristic of each of the driving thin film transistors in space and the characteristic deviation in time will cause a display to be uneven.

SUMMARY OF THE INVENTION

An embodiment of the present application provides a display image compensation method, device, electronic equipment, and storage medium, which can improve the brightness uniformity of the display image, reduce power consumption, and extend the service life of the product.

In a first aspect, the embodiment of the present application provides a display image compensation method, comprising following steps of:

obtaining a display image and determining whether the display image is a still image;

if the display image is a still image, preprocessing the still image to reduce power consumption of the display image, thereby obtaining a target display image after preprocessing;

detecting the target display image to obtain a threshold voltage data and a mobility parameter; and compensating the display image according to the threshold voltage data and the mobility parameter;

wherein the step of detecting the target display image to obtain a threshold voltage data and a mobility parameter comprises:

entering a detection display mode to reduce a frame rate of the target display image from an initial value to a preset value; and detecting the threshold voltage data and the mobility parameter from the non-data update period to obtain the threshold voltage data and the mobility parameter;

wherein the step of obtaining a display image and determining whether the display image is a still image comprises:

determining whether continuous frames of the display image are the same;

if they are the same, it is determined that the display image is a still image;

if they are not the same, it is determined that the display image is not a still image.

In the display image compensation method after the step of obtaining a display image and determining whether the display image is a still image, and before the step of compensating the display image according to the threshold voltage data and the mobility parameter also comprises:

if the display image is a non-still image, the display image is directly detected to obtain the threshold voltage data and the mobility parameter.

In the display image compensation method described in the embodiment of the present application, the step of preprocessing the still image to reduce power consumption of the display image, thereby obtaining a target display image after preprocessing comprises:

reducing a brightness of the display image according to a number of frames of the still image, thereby obtaining the target display image after preprocessing.

In the display image compensation method described in the embodiment of the present application, the step of reducing a brightness of the display image according to a number of frames of the still image, thereby obtaining the target display image after preprocessing comprises:

according to the increase of the number of frames of the still image, the brightness of the display image is gradually reduced to a preset brightness value, thereby obtaining the target display image after preprocessing.

In the display image compensation method described in the embodiment of the present application, the step of reducing a brightness of the display image according to a number of frames of the still image, thereby obtaining the target display image after preprocessing comprises:

after the number of frames of the still image is increased to a preset frame value, the brightness of the display image is directly reduced to the preset brightness value, thereby obtaining the target display image after preprocessing.

In a second aspect, the embodiment of the present application provides a display image compensation method, comprising following steps of:

obtaining a display image and determining whether the display image is a still image;

if the display image is a still image, preprocessing the still image to reduce power consumption of the display image, thereby obtaining a target display image after preprocessing;

detecting the target display image to obtain a threshold voltage data and a mobility parameter; and compensating the display image according to the threshold voltage data and the mobility parameter.

In the display image compensation method described in the embodiment of the present application, after the step of obtaining a display image and determining whether the display image is a still image, and before the step of compensating the display image according to the threshold voltage data and the mobility parameter also comprises:

if the display image is a non-still image, the display image is directly detected to obtain the threshold voltage data and the mobility parameter.

In the display image compensation method described in the embodiment of the present application, the step of preprocessing the still image to reduce power consumption of the display image, thereby obtaining a target display image after preprocessing comprises:

reducing a brightness of the display image according to a number of frames of the still image, thereby obtaining the target display image after preprocessing.

In the display image compensation method described in the embodiment of the present application, the step of reducing a brightness of the display image according to a number of frames of the still image, thereby obtaining the target display image after preprocessing comprises:

according to the increase of the number of frames of the still image, the brightness of the display image is gradually reduced to a preset brightness value, thereby obtaining the target display image after preprocessing.

In the display image compensation method described in the embodiment of the present application, the step of reducing a brightness of the display image according to a number of frames of the still image, thereby obtaining the target display image after preprocessing comprises:

after the number of frames of the still image is increased to a preset frame value, the brightness of the display image is directly reduced to the preset brightness value, thereby obtaining the target display image after preprocessing.

In the display image compensation method described in the embodiment of the present application, the step of detecting the target display image to obtain a threshold voltage data and a mobility parameter comprises:

entering a detection display mode to reduce a frame rate of the target display image from an initial value to a preset value: and detecting the threshold voltage data and the mobility parameter from the non-data update period to obtain the threshold voltage data and the mobility parameter.

In the display image compensation method described in the embodiment of the present application, the step of obtaining a display image and determining whether the display image is a still image comprises:

determining whether continuous frames of the display image are the same;

if they are the same, it is determined that the display image is a still image;

if they are not the same, it is determined that the display image is not a still image.

In a third aspect, the embodiment of the present application provides a display image compensation device, comprising:

a judging module configured to obtain a display image and determine whether the display image is a still image;

a preprocessing module configured to preprocess the still image to reduce power consumption of the display image if the display image is a still image, thereby obtaining a target display image after preprocessing;

an obtaining module configured to detect the target display image to obtain a threshold voltage data and a mobility parameter;

a compensation module configured to compensate the display image according to the threshold voltage and the mobility parameter.

In the display image compensation device described in the embodiment of the present application, the preprocessing module is specifically configured to:

reducing a brightness of the display image according to a number of frames of the still image, thereby obtaining the target display image after preprocessing.

In the display image compensation device described in the embodiment of the present application, the preprocessing module is further specifically configured to:

according to the increase of the number of frames of the still image, the brightness of the display image is gradually reduced to a preset brightness value, thereby obtaining the target display image after preprocessing.

In the display image compensation device described in the embodiment of the present application, the preprocessing module is further specifically configured to:

after the number of frames of the still image is increased to a preset frame value, the brightness of the display image is directly reduced to the preset brightness value, thereby obtaining the target display image after preprocessing.

In the display image compensation device described in the embodiment of the present application, the obtaining module is specifically configured to:

entering a detection display mode to reduce a frame rate of the target display image from an initial value to a preset value; and detecting the threshold voltage data and the mobility parameter from the non-data update period to obtain the threshold voltage data and the mobility parameter.

In the display image compensation device described in the embodiment of the present application, the judging module is specifically configured to:

determining whether continuous frames of the display image are the same;

if they are the same, it is determined that the display image is a still image;

if they are not the same, it is determined that the display image is not a still image.

The embodiment of the application obtains a display image and determines whether the display image is a still image; if the display image is a still image, preprocessing the still image to reduce power consumption of the display image, thereby obtaining a target display image after preprocessing; detecting the target display image to obtain a threshold voltage data and a mobility parameter; compensating the display image according to the threshold voltage data and the mobility parameter, thereby realizing image compensation. Since the still image is preprocessed to reduce its power consumption during compensation, it meets the requirement of synchronous detection and compensation of the threshold voltage and mobility parameters of the panel drive during the display process, which can improve the brightness uniformity of the display image, reduce power consumption and extend product life.

BRIEF DESCRIPTION OF THE SEVERAL VIEWS OF THE DRAWINGS

In order to more clearly explain the technical solutions in the embodiments of the present application, the following will briefly introduce the drawings required in the description of the embodiments. Obviously, the drawings in the following description are only some embodiments of the present application. For those skilled in the art, without paying any creative work, other drawings can be obtained based on these drawings.

DETAILED DESCRIPTION OF PREFERRED SPECIFIC EMBODIMENTS OF THE INVENTION

The technical solutions in the embodiments of the present application will be described clearly and completely with reference to the drawings in the embodiments of the present application. Obviously, the described embodiments are only a part of the embodiments of the present application, but not all the embodiments. Based on the embodiments in the present application, all other embodiments obtained by those skilled in the art without making creative work fall within the protection scope of the present application.

Figure 1:
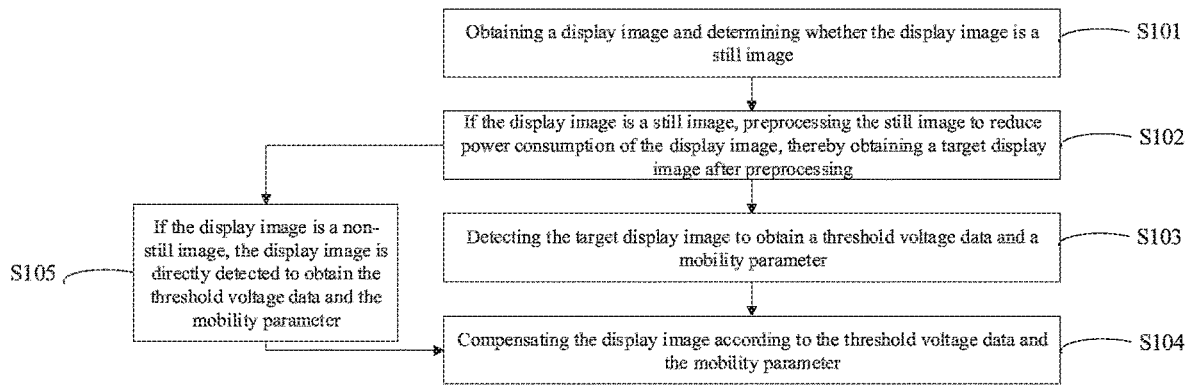
FIG. 1 is a flow chart of a display image compensation method provided by an embodiment of the present application.

Please refer to FIG. 1. FIG. 1 is a flow chart of a display image compensation method provided by an embodiment of the present application. As shown in FIG. 1, the display image compensation method provided by the embodiment of the present application is configured to compensate a display image of a display panel. The display image compensation method comprises following steps of:

S101. Obtaining a display image and determining whether the display image is a still image.

S102. If the display image is a still image, preprocessing the still image to reduce power consumption of the display image, thereby obtaining a target display image after preprocessing.

S103. Detecting the target display image to obtain a threshold voltage data and a mobility parameter.

S104. Compensating the display image according to the threshold voltage data and the mobility parameter.

Figure 2:
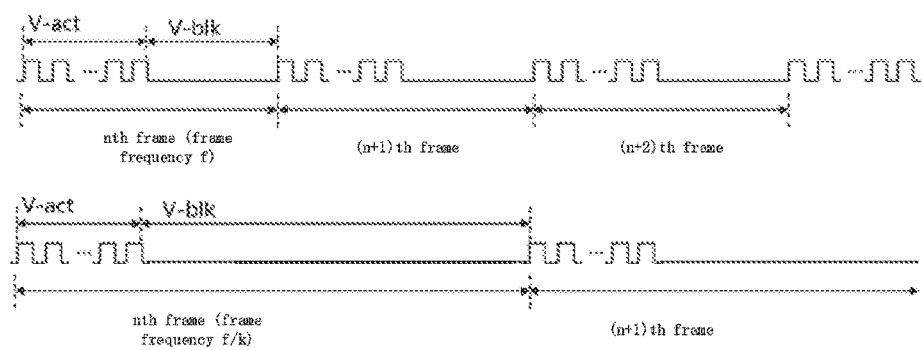
FIG. 2 is a specific schematic diagram of step S101 of the display image compensation method provided by the embodiment of the present application.

In this step S101, please refer to FIG. 2. FIG. 2 is a specific schematic diagram of step S101 of the display image compensation method provided by the embodiment of the present application. As shown in FIG. 2, the way to determine whether the display image is still comprises, but is not limited to, the current frame is consistent with the previous continuous multi-frame of display image data, for example, the display image data of the (n+m)th frame is consistent with the nth frame to the (n+m−1)th frame, it is determined that the display image is a still display image at this time.

Wherein, in this step S102, the preprocessing method may be to reduce the brightness of the display image, thereby reducing the power consumption of the display image. Of course, there are many ways to reduce the brightness of the display image.

In some embodiments, according to the increase of the number of frames of the still image, the brightness of the display image is gradually reduced to a preset brightness value, thereby obtaining the target display image after preprocessing.

In some embodiments, after the number of frames of the still image is increased to a preset frame value, the brightness of the display image is directly reduced to the preset brightness value, thereby obtaining the target display image after preprocessing.

Wherein, in this step S103, the threshold voltage data and the mobility parameter obtained by detecting the target display image need to be stored in a preset location, so that they can be directly recalled in the compensation operation of the subsequent step.

Specifically, in some embodiments, this step S103 comprises following sub-steps of: S1031, entering a detection display mode to reduce a frame rate of the target display image from an initial value to a preset value; S1032, detecting the threshold voltage data and the mobility parameter from the non-data update period to obtain the threshold voltage data and the mobility parameter.

Figure 3:
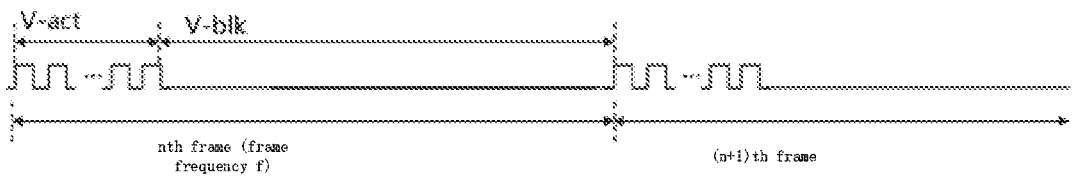
FIG. 3 is a specific schematic diagram of step S103 of the display image compensation method provided by the embodiment of the present application.

Please refer to FIG. 3. FIG. 3 is a specific schematic diagram of step S103 of the display image compensation method provided by the embodiment of the present application. As shown in FIG. 3, entering the detection display mode, reduce the frame rate to 1/K of the initial value, and keep the data update time unchanged, that is, V-act unchanged, optionally, k=2, 3, 4, etc. K is determined by the pixel charge retention time, display image resolution, frame rate, and detection time. In the non-data update period, the threshold voltage Vth and the mobility u are detected from the last feedback detection position, the detected threshold voltage and the mobility parameter are stored, and the new feedback detection position is stored. Among them, the new feedback detection position is not the next line or the next sub-pixel of the previous feedback detection position.

Figure 4:
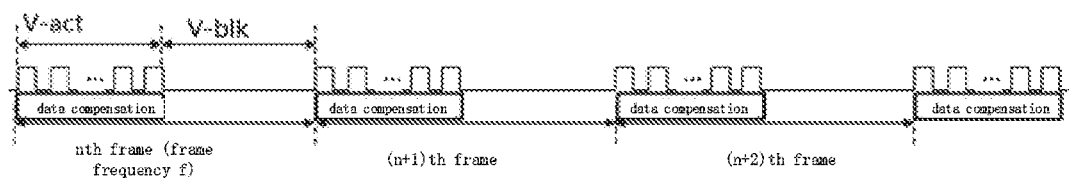
FIG. 4 is a specific schematic diagram of compensating for a non-still image in the display image compensation method provided by the embodiment of the present application.
Figure 5:
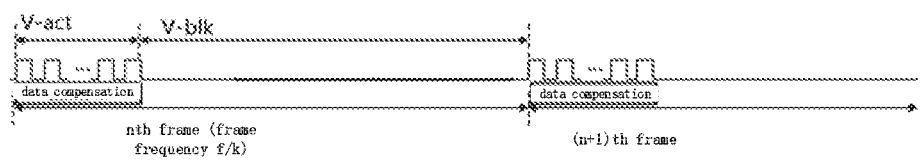
FIG. 5 is a specific schematic diagram of compensating for a still image in the display image compensation method provided by the embodiment of the present application.
Figure 6:
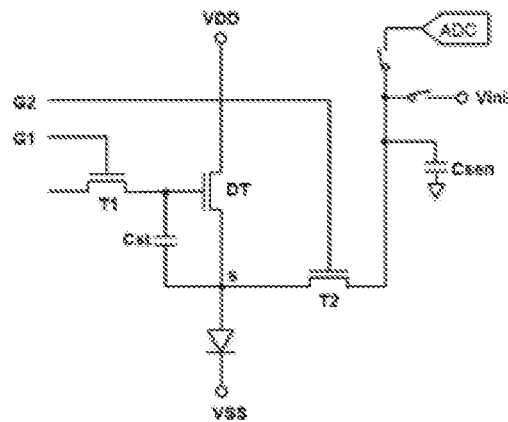
FIG. 6 is an external compensation pixel structure of the display panel in the display image compensation method provided by the embodiment of the present application.

In this step S104, please refer to FIG. 4 and FIG. 5. FIG. 4 is a specific schematic diagram of compensating for a non-still image in the display image compensation method provided by the embodiment of the present application. FIG. 5 is a specific schematic diagram of compensating for a still image in the display image compensation method provided by the embodiment of the present application. As shown in FIG. 4 and FIG. 5, whether it is a still image or a non-still image, the stored threshold voltage and the mobility parameter can be used for compensation during the data update period. As shown in FIG. 6. FIG. 6 is an external compensation pixel structure of the display panel.

Wherein, between step S104 and step S103, the method further comprises following steps of: S105. If the display image is a non-still image, the display image is directly detected to obtain the threshold voltage data and the mobility parameter. Wherein, the detection method in step S105 is the prior art, therefore, it is unnecessary to describe too much.

Understandably, in some embodiments, after the display image is compensated, other relevant algorithms can be used to process the compensated display image data, and then a new video signal is generated and output according to the new display data and timing relationship.

It can be seen from the above that the embodiment of the application obtains a display image and determines whether the display image is a still image; if the display image is a still image, preprocessing the still image to reduce power consumption of the display image, thereby obtaining a target display image after preprocessing; detecting the target display image to obtain a threshold voltage data and a mobility parameter; compensating the display image according to the threshold voltage data and the mobility parameter, thereby realizing image compensation. Since the still image is preprocessed to reduce its power consumption during compensation, it meets the requirement of synchronous detection and compensation of the threshold voltage and mobility parameters of the panel drive during the display process, which can improve the brightness uniformity of the display image, reduce power consumption and extend product life.

Figure 7:
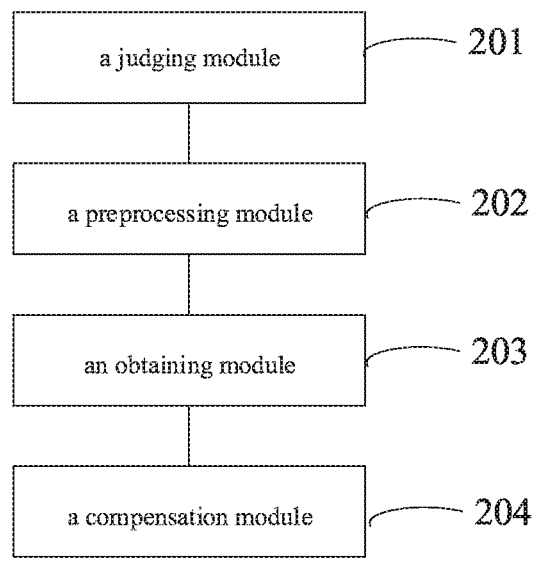
FIG. 7 is a schematic structural diagram of a display image compensation device provided by the embodiment of the present application.

Please refer to FIG. 7. FIG. 7 is a schematic structural diagram of a display image compensation device provided by the embodiment of the present application. As shown in FIG. 7, the display image compensation device comprises: a judging module 201, a preprocessing module 202, an obtaining module 203, and a compensation module 204.

Wherein, the judging module 201 is configured to obtain a display image and determine whether the display image is a still image; as shown in FIG. 2, the way to determine whether the display image is still comprises, but is not limited to, the current frame is consistent with the previous continuous multi-frame of display image data, for example, the display image data of the (n+m)th frame is consistent with the nth frame to the (n+m−1)th frame, it is determined that the display image is a still display image at this time.

Wherein, the preprocessing module 202 is configured to preprocess the still image to reduce power consumption of the display image if the display image is a still image, thereby obtaining a target display image after preprocessing; the preprocessing method may be to reduce the brightness of the display image, thereby reducing the power consumption of the display image. Of course, there are many ways to reduce the brightness of the display image.

In some embodiments, according to the increase of the number of frames of the still image, the brightness of the display image is gradually reduced to a preset brightness value, thereby obtaining the target display image after preprocessing.

In some embodiments, according to the increase of the number of frames of the still image, the brightness of the display image is gradually reduced to a preset brightness value, thereby obtaining the target display image after preprocessing.

Wherein, the obtaining module 203 is configured to detect the target display image to obtain a threshold voltage data and a mobility parameter; the obtaining module 203 is configured to enter a detection display mode to reduce a frame rate of the target display image from an initial value to a preset value; and detect the threshold voltage data and the mobility parameter from the non-data update period to obtain the threshold voltage data and the mobility parameter.

As shown in FIG. 3, entering the detection display mode, reduce the frame rate to 1/K of the initial value, and keep the data update time unchanged, that is, V-act unchanged, optionally, k=2, 3, 4, etc. K is determined by the pixel charge retention time, display image resolution, frame rate, and detection time. In the non-data update period, the threshold voltage Vth and the mobility u are detected from the last feedback detection position, the detected threshold voltage and the mobility parameter are stored, and the new feedback detection position is stored. Among them, the new feedback detection position is not the next line or the next sub-pixel of the previous feedback detection position.

Wherein, the compensation module 204 is configured to compensate the display image according to the threshold voltage and the mobility parameter. As shown in FIG. 4 and FIG. 5, whether it is a still image or a non-still image, the stored threshold voltage and the mobility parameter can be used for compensation during the data update period. As shown in FIG. 6. FIG. 6 is an external compensation pixel structure of the display panel. The compensation module 204 is also configured to directly detect the display image if the display image is a non-still image to obtain the threshold voltage data and the mobility parameter. Wherein, the detection method in step S105 is the prior art, therefore, it is unnecessary to describe too much.

Understandably, in some embodiments, after the display image is compensated, other relevant algorithms can be used to process the compensated display image data, and then a new video signal is generated and output according to the new display data and timing relationship.

It can be seen from the above that the embodiment of the application obtains a display image and determines whether the display image is a still image; if the display image is a still image, preprocessing the still image to reduce power consumption of the display image, thereby obtaining a target display image after preprocessing; detecting the target display image to obtain a threshold voltage data and a mobility parameter; compensating the display image according to the threshold voltage data and the mobility parameter, thereby realizing image compensation. Since the still image is preprocessed to reduce its power consumption during compensation, it meets the requirement of synchronous detection and compensation of the threshold voltage and mobility parameters of the panel drive during the display process, which can improve the brightness uniformity of the display image, reduce power consumption and extend product life.

Figure 8:
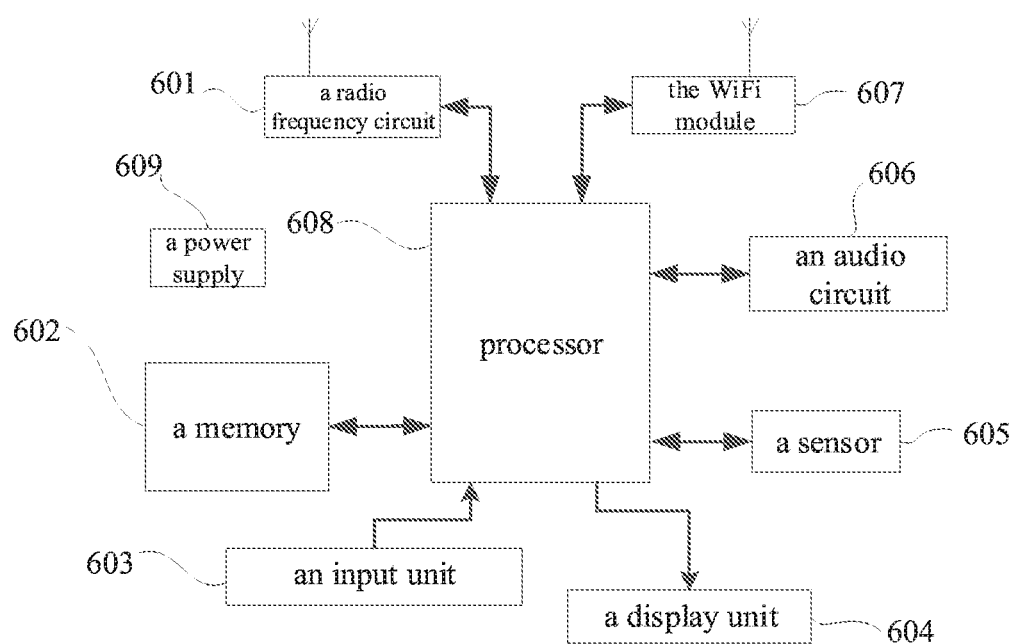
FIG. 8 is a schematic structural diagram of an electronic device provided by the embodiment of the present application.

Correspondingly, the embodiments of the present application also provide an electronic device. As shown in FIG. 8, the electronic device may comprise a radio frequency (RF) circuit 601, a memory 602 including one or more computer-readable storage media, an input unit 603, a display unit 604, a sensor 605, an audio circuit 606, a wireless fidelity (WiFi) module 607, a processor 608 including one or more processing cores, and a power supply 609 and other components. Those skilled in the art may understand that the terminal structure shown in FIG. 12 does not constitute a limitation on the terminal, and may comprise more or fewer components than those illustrated, or combine certain components, or arrange different components.

Wherein, the RF circuit 601 can be used to receive and send signals during the sending and receiving of information or during a call. In particular, after receiving the downlink information of a base station, it is handed over to one or more processors 608; in addition, the data related to the uplink is sent to the base station. Generally, the RF circuit 601 comprises, but is not limited to, an antenna, at least one amplifier, a tuner, one or more oscillators, a subscriber identity module (SIM) card, a transceiver, a coupler, a low-noise amplifier (LNA), duplexer, etc. In addition, the RF circuit 601 can also communicate with other devices via a wireless communication network. The wireless communication may use any communication standard or protocol, including but not limited to Global System for Mobile Communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), etc.

The memory 602 may be used to store software programs and modules. The processor 608 executes various functional applications and data processing by running the software programs and modules stored in the memory 602. The memory 602 may mainly comprise a storage program area and a storage data area, wherein the storage program area may store an operating system, application programs required by at least one function (such as a sound playback function, an image playback function, etc.), and more. The storage data area may store the data created by the use of the terminal (such as audio data, phone book, etc.), and more. In addition, the memory 602 may comprise a high-speed random access memory, and may also comprise a non-volatile memory, such as at least one magnetic disk storage device, a flash memory device, or other volatile solid-state storage devices. Accordingly, the memory 602 may further comprise a memory controller to provide access to the memory 602 by the processor 608 and the input unit 603.

The input unit 603 can be used to receive input digital or character information, and generate keyboard, mouse, joystick, optical or trackball signal inputs related to user settings and function control. Specifically, in a specific embodiment, the input unit 603 may comprise a touch-sensitive surface and other input devices. A touch-sensitive surface, also known as a touch screen or touchpad, can collect user touch operations on or near it (for example, the user uses any suitable objects or accessories such as fingers, stylus, etc. on the touch-sensitive surface or touch-sensitive operation near the surface), and drive the corresponding connection device according to the preset program. Optionally, the touch-sensitive surface may comprise a touch detection device and a touch controller. Wherein, the touch detection device detects the user's touch orientation, detects the signal brought by the touch operation, and transmits the signal to the touch controller; the touch controller receives touch information from the touch detection device, and converts it into contact coordinates, and then sends it to the processor 608, and can receive the command sent by the processor 608 and execute it. In addition, a variety of types such as resistive, capacitive, infrared, and surface acoustic waves can be used to implement touch-sensitive surfaces. In addition to the touch-sensitive surface, the input unit 603 may also comprise other input devices. Specifically, other input devices may comprise, but are not limited to, one or more of a physical keyboard, function keys (such as volume control keys, switch keys, etc.), trackball, mouse, joystick, and so on.

The display unit 604 can be used to display information input by the user or information provided to the user and various graphical user interfaces of the terminal. These graphical user interfaces can be composed of graphics, text, icons, video, and any combination thereof. The display unit 604 may comprise a display panel. Alternatively, the display panel may be configured in the form of a liquid crystal display (LCD), an organic light-emitting diode (OLED), or the like. Further, the touch-sensitive surface may cover the display panel, and when the touch-sensitive surface detects a touch operation on or near it, it is transmitted to the processor 608 to determine the type of touch event, and then the processor 608 displays on the display according to the type of touch event. The corresponding visual output is provided on the panel. Although in FIG. 8, the touch-sensitive surface and the display panel are implemented as two independent components to realize the input and input functions, in some embodiments, the touch-sensitive surface and the display panel may be integrated to realize the input and output functions.

The electronic device may further comprise at least one sensor 605, such as a light sensor, a motion sensor, and other sensors. Specifically, the light sensor may comprise an ambient light sensor and a proximity sensor, wherein the ambient light sensor may adjust the brightness of the display panel according to the brightness of the ambient light, and the proximity sensor may turn off the display panel and/or the backlight when the terminal moves to the ear. As a kind of motion sensor, the gravity acceleration sensor can detect the magnitude of acceleration in various directions (generally three axes), and can detect the magnitude and direction of gravity when at rest, and can be used to identify the gestures of mobile phones (such as horizontal and vertical screen switching, related games, magnetometer posture calibration), vibration recognition related functions (such as pedometer, tap), etc. As for other sensors that can be configured on the terminal, such as gyroscopes, barometers, hygrometers, thermometers, infrared sensors, etc., they shall not be repeated hereafter.

The audio circuit 606, the speaker, and the microphone can provide an audio interface between the user and the terminal. The audio circuit 606 can transmit the converted electrical signal of the received audio data to the speaker, which converts it into a sound signal output; on the other hand, the microphone converts the collected sound signal into an electrical signal, which is converted by the audio circuit 606 into audio data after being received. After the audio data is processed by the audio data output processor 608, it is sent to, for example, another terminal through the RF circuit 601, or the audio data is output to the memory 602 for further processing. The audio circuit 606 may also comprise an earplug jack to provide communication between the peripheral headset and the terminal.

WiFi is a short-range wireless transmission technology. The terminal can help users send and receive emails, browse web pages, and access streaming media through the WiFi module 607. It provides users with wireless broadband Internet access. Although FIG. 8 shows the WiFi module 607, it can be understood that it is not an essential component of the terminal, and can be omitted without changing the scope of the essence of the application as needed.

The processor 608 is the control center of the terminal, connects various parts of the entire mobile phone with various interfaces and lines, runs or executes software programs and/or modules stored in the memory 602, and calls data stored in the memory 602 to execute various functions and processing data of the terminal, so as to monitor the mobile phone as a whole. Optionally, the processor 608 may comprise one or more processing cores; preferably, the processor 608 may integrate an application processor and a modem processor, wherein the application processor mainly processes an operating system, a user interface, and application programs, etc. The modem processor mainly handles wireless communication. It can be understood that the above-mentioned modem processor may not be integrated into the processor 608.

The electronic device further comprises a power supply 609 (such as a battery) that supplies power to various components. Preferably, the power supply can be logically connected to the processor 608 through the power management system, so as to implement functions such as charging, discharging, and power management through the power management system. The power supply 609 may also comprise any component such as one or more DC or AC power supplies, a recharging system, a power failure detection circuit, a power converter or inverter, and a power status indicator.

Although not shown, the electronic device may also comprise a camera, a Bluetooth module, and so on, which will not be repeated here. Specifically in this embodiment, the processor 608 in the electronic device loads the executable file corresponding to the process of one or more application programs into the memory 602 according to the following instructions, and the processor 608 runs and stores the application program in the memory 602 to realize various functions:

Obtaining a display image and determining whether the display image is a still image; if the display image is a still image, preprocessing the still image to reduce power consumption of the display image, thereby obtaining a target display image after preprocessing; detecting the target display image to obtain a threshold voltage data and a mobility parameter; and compensating the display image according to the threshold voltage data and the mobility parameter.

Those of ordinary skill in the art may understand that all or part of the steps in the various methods of the above embodiments may be completed by instructions, or by controlling related hardware by instructions, and the instructions may be stored in a computer-readable storage medium, and is loaded and executed by the processor.

To this end, an embodiment of the present application provides a storage medium in which multiple instructions are stored, and the instruction can be loaded by a processor to perform steps in any of the charging time modulating methods provided in the embodiments of the present application. For example, the instruction can perform the following steps:

Obtaining a display image and determining whether the display image is a still image; if the display image is a still image, preprocessing the still image to reduce power consumption of the display image, thereby obtaining a target display image after preprocessing; detecting the target display image to obtain a threshold voltage data and a mobility parameter; and compensating the display image according to the threshold voltage data and the mobility parameter.

The specific implementation of the above operations can refer to the previous embodiments, and will not be repeated here.

The storage medium may comprise: read only memory (ROM), random access memory (RAM), magnetic disk, or optical disk.

Since the instructions stored in the storage medium can perform the steps in any of the display image compensation methods provided in the embodiments of the present application, therefore, any of the charging time modulating methods provided in the embodiments of the present application can be implemented. For the beneficial effects achieved, please refer to the previous embodiments for details, which will not be repeated here.

The display image compensation method, device, storage medium, and electronic equipment provided by the embodiments of the present application are described in detail above, and specific examples are used in this article to explain the principles and implementation modes of the present application. It is only used to help understand the method and core ideas of this application; meanwhile, for those skilled in the art, according to the ideas of this application, there will be changes in the specific implementation and application scope. In summary, the content of the description should not be construed as limiting the application.

What is claimed is:

1. A display image compensation method, comprising the steps of:
    obtaining a display image and determining whether the display image is a still image or a non-still image;
    when the display image is determined to be a non-still image, directly detecting the display image to obtain a threshold voltage data and a mobility parameter;
    when the display image is determined to be a still image, preprocessing the still image to reduce power consumption of the display image, thereby obtaining a target display image after preprocessing;
    detecting the target display image to obtain the threshold voltage data and the mobility parameter; and
    compensating the display image according to the threshold voltage data and the mobility parameter;
    wherein the step of detecting the target display image to obtain the threshold voltage data and the mobility parameter comprises:
    entering a detection display mode to reduce a frame rate of the target display image from an initial value to a preset value; and
    detecting the threshold voltage data and the mobility parameter from the non-data update period to obtain the threshold voltage data and the mobility parameter;
    wherein the step of obtaining a display image and determining whether the display image is a still image or a non-still image comprises:
    determining whether continuous frames of the display image are the same;
    when they are determined to be the same, it is determined that the display image is a still image;
    when they are determined not to be the same, it is determined that the display image is not a still image.

2. The display image compensation method of claim 1, wherein the step of preprocessing the still image to reduce power consumption of the display image, thereby obtaining a target display image after preprocessing comprises:
    reducing a brightness of the display image according to a number of frames of the still image, thereby obtaining the target display image after preprocessing.

3. The display image compensation method of claim 2, wherein the step of reducing a brightness of the display image according to a number of frames of the still image, thereby obtaining the target display image after preprocessing comprises:
    according to the increase of the number of frames of the still image, the brightness of the display image is gradually reduced to a preset brightness value, thereby obtaining the target display image after preprocessing.

4. The display image compensation method of claim 2, wherein the step of reducing a brightness of the display image according to a number of frames of the still image, thereby obtaining the target display image after preprocessing comprises:
    after the number of frames of the still image is increased to a preset frame value, the brightness of the display image is directly reduced to the preset brightness value, thereby obtaining the target display image after preprocessing.

5. A display image compensation method, comprising the steps of:
    obtaining a display image and determining whether the display image is a still image or a non-still image;
    when the display image is determined to be a non-still image, directly detecting the display image to obtain a threshold voltage data and a mobility parameter;
    directly compensating the display image according to the threshold voltage data and the mobility parameter;
    when the display image is determined to be a still image, preprocessing the still image to reduce power consumption of the display image, thereby obtaining a target display image after preprocessing;
    detecting the target display image to obtain the threshold voltage data and the mobility parameter; and
    compensating the display image according to the threshold voltage data and the mobility parameter.

6. The display image compensation method of claim 5, wherein the step of preprocessing the still image to reduce power consumption of the display image, thereby obtaining a target display image after preprocessing comprises:

reducing a brightness of the display image according to a number of frames of the still image, thereby obtaining the target display image after preprocessing.

7. The display image compensation method of claim 6, wherein the step of reducing a brightness of the display image according to a number of frames of the still image, thereby obtaining the target display image after preprocessing comprises:

according to the increase of the number of frames of the still image, the brightness of the display image is gradually reduced to a preset brightness value, thereby obtaining the target display image after preprocessing.

8. The display image compensation method of claim 6, wherein the step of reducing a brightness of the display image according to a number of frames of the still image, thereby obtaining the target display image after preprocessing comprises:

after the number of frames of the still image is increased to a preset frame value, the brightness of the display image is directly reduced to the preset brightness value, thereby obtaining the target display image after preprocessing.

9. The display image compensation method of claim 5, wherein the step of detecting the target display image to obtain a threshold voltage data and a mobility parameter comprises:

entering a detection display mode to reduce a frame rate of the target display image from an initial value to a preset value; and detecting the threshold voltage data and the mobility parameter from the non-data update period to obtain the threshold voltage data and the mobility parameter.

10. The display image compensation method of claim 5, wherein the step of obtaining a display image and determining whether the display image is a still image comprises:

determining whether continuous frames of the display image are the same;

when they are determined to be the same, it is determined that the display image is a still image;

when they are determined not to be the same, it is determined that the display image is not a still image.

11. A display image compensation device, comprising:

a judging module configured to obtain a display image and determine whether the display image is a still image or a non-still image;

a preprocessing module configured to preprocess the still image to reduce power consumption of the display image when the display image is determined to be a still image, thereby obtaining a target display image after preprocessing, and to reduce a brightness of the display image according to a number of frames of the still image, thereby obtaining the target display image after preprocessing, wherein according to the increase of the number of frames of the still image, the brightness of the display image is gradually reduced to a preset brightness value;

an obtaining module configured to detect the target display image to obtain a threshold voltage data and a mobility parameter, and to directly detect the display image to obtain a threshold voltage data and a mobility parameter when the display image is determined to be a non-still image;

a compensation module configured to compensate the display image according to the threshold voltage data and the mobility parameter, and to directly compensate the display image according to the threshold voltage data and the mobility parameter when the display image is determined to be a non-still image.

12. The display image compensation device of claim 11, wherein the preprocessing module is further specifically configured to:

after the number of frames of the still image is increased to a preset frame value, the brightness of the display image is directly reduced to the preset brightness value, thereby obtaining the target display image after preprocessing.

13. The display image compensation device of claim 11, wherein the obtaining module is specifically configured to:

entering a detection display mode to reduce a frame rate of the target display image from an initial value to a preset value; and detecting the threshold voltage data and the mobility parameter from the non-data update period to obtain the threshold voltage data and the mobility parameter.

14. The display image compensation device of claim 11, wherein the judging module is specifically configured to:

determining whether continuous frames of the display image are the same;

when they are determined to be the same, it is determined that the display image is a still image;

when they are determined not to be the same, it is determined that the display image is not a still image.

* * * * *